(12) United States Patent
Maupin

(10) Patent No.: US 7,168,846 B1
(45) Date of Patent: Jan. 30, 2007

(54) ROTARY PROCESSING DEVICE

(75) Inventor: Daniel D. Maupin, Corvallis, OR (US)

(73) Assignee: Lyco Manufacturing, Inc., Columbus, WI (US)

( * ) Notice: Subject to any disclaimer, the term of this patent is extended or adjusted under 35 U.S.C. 154(b) by 70 days.

(21) Appl. No.: 10/760,442

(22) Filed: Jan. 20, 2004

(51) Int. Cl.
*B01F 9/00* (2006.01)

(52) U.S. Cl. .................. 366/226; 366/227; 366/228

(58) Field of Classification Search ............... 366/225, 366/226, 227, 228, 229
See application file for complete search history.

(56) References Cited

U.S. PATENT DOCUMENTS

| | | | | |
|---|---|---|---|---|
| 44,704 | A | * | 10/1864 | Burns .................. 366/227 |
| 324,595 | A | * | 8/1885 | Saint Requier .......... 209/284 |
| 578,628 | A | * | 3/1897 | Cooper ................ 366/227 |
| 943,294 | A | * | 12/1909 | Baker ................... 165/90 |
| 1,258,326 | A | * | 3/1918 | Fay ..................... 366/144 |
| 2,322,189 | A | * | 6/1943 | Cole .................... 366/108 |
| 2,536,054 | A | * | 1/1951 | Harrington .............. 99/458 |
| 2,899,176 | A | * | 8/1959 | Francis et al. ........... 165/87 |
| 3,216,345 | A | * | 11/1965 | Parker et al. ............ 99/276 |
| 3,552,721 | A | * | 1/1971 | Phillips ................ 366/135 |
| 3,760,714 | A | * | 9/1973 | Lortz ................... 99/404 |
| 4,025,131 | A | | 5/1977 | Bergquist et al. |
| 4,303,282 | A | | 12/1981 | Maher |
| 4,729,664 | A | * | 3/1988 | Kamiwano et al. ........ 366/230 |
| 4,815,585 | A | | 3/1989 | May |
| 4,981,073 | A | | 1/1991 | Zittel |
| 5,085,520 | A | | 2/1992 | Fujan |
| 5,281,033 | A | | 1/1994 | Ide |
| 5,329,842 | A | | 7/1994 | Zittel |
| 5,332,103 | A | | 7/1994 | Zittel |
| 5,427,947 | A | * | 6/1995 | Dalos ................ 435/290.3 |
| 5,429,041 | A | | 7/1995 | Zittel |
| 5,433,530 | A | | 7/1995 | Waskiewicz |
| 5,433,849 | A | | 7/1995 | Zittel |
| 5,568,976 | A | | 10/1996 | Gabriele |
| 5,669,288 | A | | 9/1997 | Zittel et al. |
| 5,752,431 | A | | 5/1998 | Zittel |
| 5,809,787 | A | | 9/1998 | Zittel |
| 5,989,614 | A | | 11/1999 | Zittel |
| 6,047,811 | A | | 4/2000 | Zittel et al. |
| 6,095,035 | A | | 8/2000 | Zittel et al. |
| 6,105,485 | A | | 8/2000 | Zittel |
| 6,187,360 | B1 | | 2/2001 | Zittel |
| 6,214,400 | B1 | | 4/2001 | Zittel et al. |
| 6,234,066 | B1 | | 5/2001 | Zittel et al. |

(Continued)

*Primary Examiner*—Tony G. Soohoo
(74) *Attorney, Agent, or Firm*—Michael Best & Friedrich

(57) ABSTRACT

A rotary product processing device that has a frame made of endplates and at least one sidewall of one piece and unitary construction that encompasses a product processing chamber and product conveyor that is rotatively supported by a plurality of bearings that are each of one-piece, unitary and homogeneous construction. A drive cantilevers outwardly from an upraised mount of one of the endplates disposing it so it overlies part of the chamber. The endplate also carries and helps enclose a drivetrain that rotatively couples the conveyor to the drive. At least one of the bearings also functions as a thrust bearing for part of the drivetrain. Complementary angled tabs and slots facilitate assembly of the endplates and sidewall producing an integral frame. In one frame assembly method, angled lugs are received slots locating and helping self-fixture the endplates and sidewall enabling them to be attached along adjoining regions.

35 Claims, 7 Drawing Sheets

U.S. PATENT DOCUMENTS

| | | |
|---|---|---|
| 6,263,785 B1 | 7/2001 | Zittel |
| 6,419,094 B1 | 7/2002 | Zittel et al. |
| 6,502,993 B2 | 1/2003 | Sasaki et al. |
| 6,615,707 B1 | 9/2003 | Zittel et al. |
| 2004/0069152 A1* | 4/2004 | Zittel et al. .................. 99/348 |

* cited by examiner

ROTARY PROCESSING DEVICE

FIELD OF THE INVENTION

The present invention relates to a rotary processing device and more particularly to a rotary food processing device that is capable of processing food related waste.

BACKGROUND OF THE INVENTION

In the past, conventional rotary processing devices utilized a frame from which components of the device were hung. These components included end plates, one or more sidewalls and the like. In addition, rotary components of the device are typically supported by trunnions, which are also mounted to the frame. While these devices have been commercially successful, improvements nonetheless remain.

What is needed is a rotary processing device made with a minimum of components.

SUMMARY OF THE INVENTION

The invention is directed to a rotary product processing device which is used to process product, such as food product, waste product, and the like, using a rotary action while the product is disposed in a product processing chamber. The device includes a frame, an inlet, an outlet, a product processing chamber in which product is processed, and a drive. The drive can be coupled to an auger that is disposed inside the product processing chamber. The auger can be engaged with the product processing chamber such that rotating the product processing chamber also rotates the auger. Where such engagement exists, rotation of the auger and product processing chamber occur substantially in unison therewith.

In a preferred embodiment, the frame is made up of a pair of end plates of one piece and unitary construction that are spaced apart by a sidewall that also is of one piece and unitary construction. The sidewall has a pair of side edges that are each preferably equipped with a pair of outwardly extending locator tabs that each are received in a complimentary locator slot in one of the end plates. In one preferred embodiment, each locator tab and its corresponding slot extend in a diagonal direction for providing both horizontal and vertical end plate and sidewall location during assembly.

In a preferred embodiment, there also is a hood that overlies the product processing chamber that is of one piece and unitary construction that also is equipped with integrally formed handles. In a preferred embodiment, the sidewall extends underneath the product processing chamber to form a fluid-holding tank therealong.

In a preferred embodiment, the drive is mounted to one of the end plates. Preferably, the drive is mounted to the inlet end plate and can be oriented such that it overlaps or overlies the product processing chamber. The drive preferably is coupled by a drive arrangement that is also mounted or otherwise carried by the same end plate as what carries the drive. A cover preferably mates with the end plate thereby helping to form a drive assembly enclosure therebetween that encompasses the drive arrangement.

In a preferred embodiment, there is a bearing cradle at each end that rotatively supports one end of the auger or the product processing chamber. Each bearing preferably is of one piece, unitary, non-metallic and homogenous construction. In one preferred embodiment, one bearing cradle is of two piece construction, forming an annular bearing cradle, and the other bearing cradle is annular in shape. Where such is the case, each bearing cradle component, excluding any mounting hardware, is of one piece, unitary, non-metallic and homogenous construction. In one preferred embodiment, at least one of the bearing cradles functions as both a rotary bearing and a thrust bearing.

Other objects, features, and advantages of the present invention will become apparent to those skilled in the art from the detailed description and the accompanying drawings. It should be understood, however, that the detailed description and accompanying drawings, while indicating at least one preferred embodiment of the present invention, are given by way of illustration and not of limitation. Many changes and modifications may be made within the scope of the present invention without departing from the spirit thereof, and the invention is intended to include all such modifications.

BRIEF DESCRIPTION OF THE DRAWINGS

Preferred exemplary embodiments of the invention are illustrated in the accompanying drawings in which like reference numerals represent like parts throughout and in which.

Figure 1:
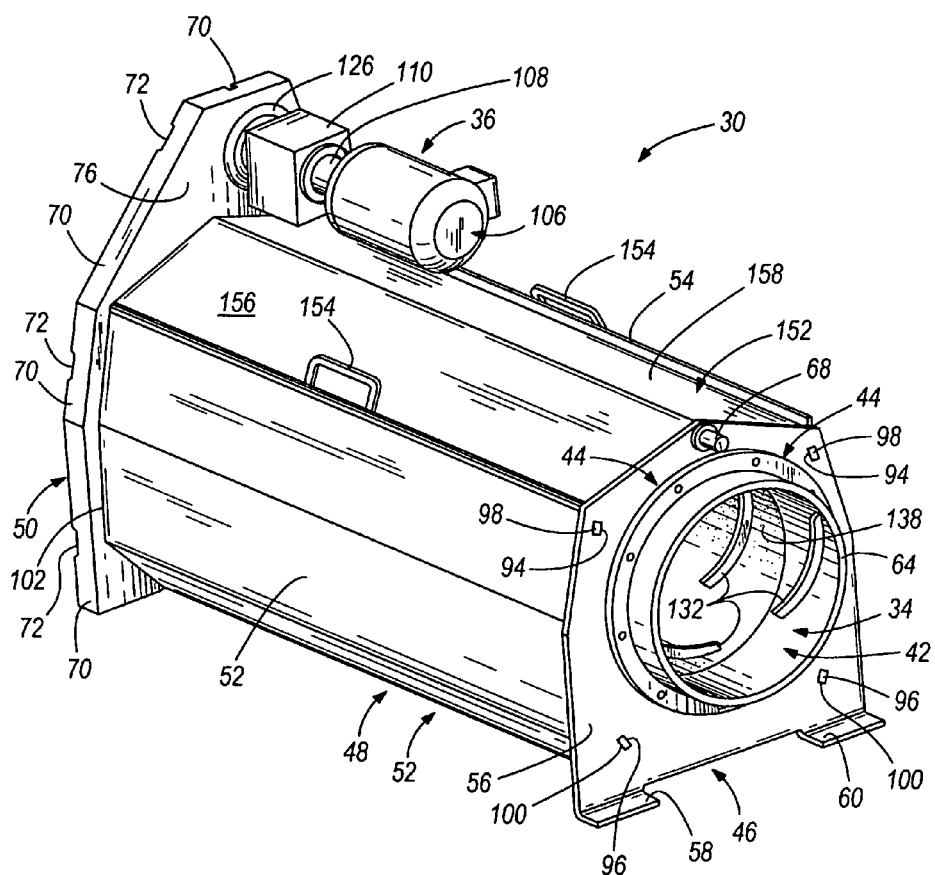
FIG. 1 is a rear perspective view of a preferred embodiment of a rotary product processing device made in accordance with the invention.

Before explaining one or more embodiments invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 2:
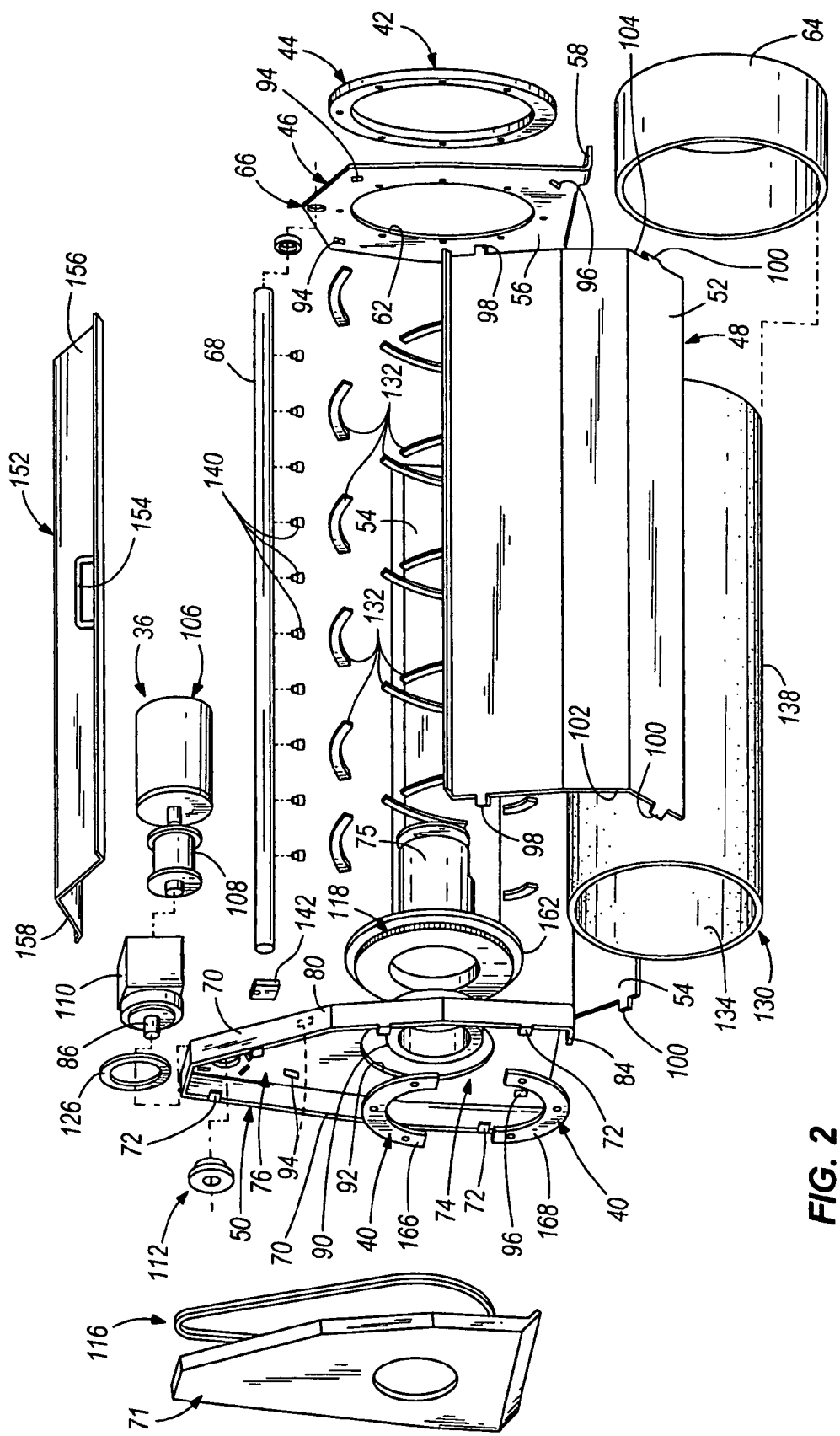
FIG. 2 is an exploded view of the rotary product processing device of FIG. 1.
Figure 3:
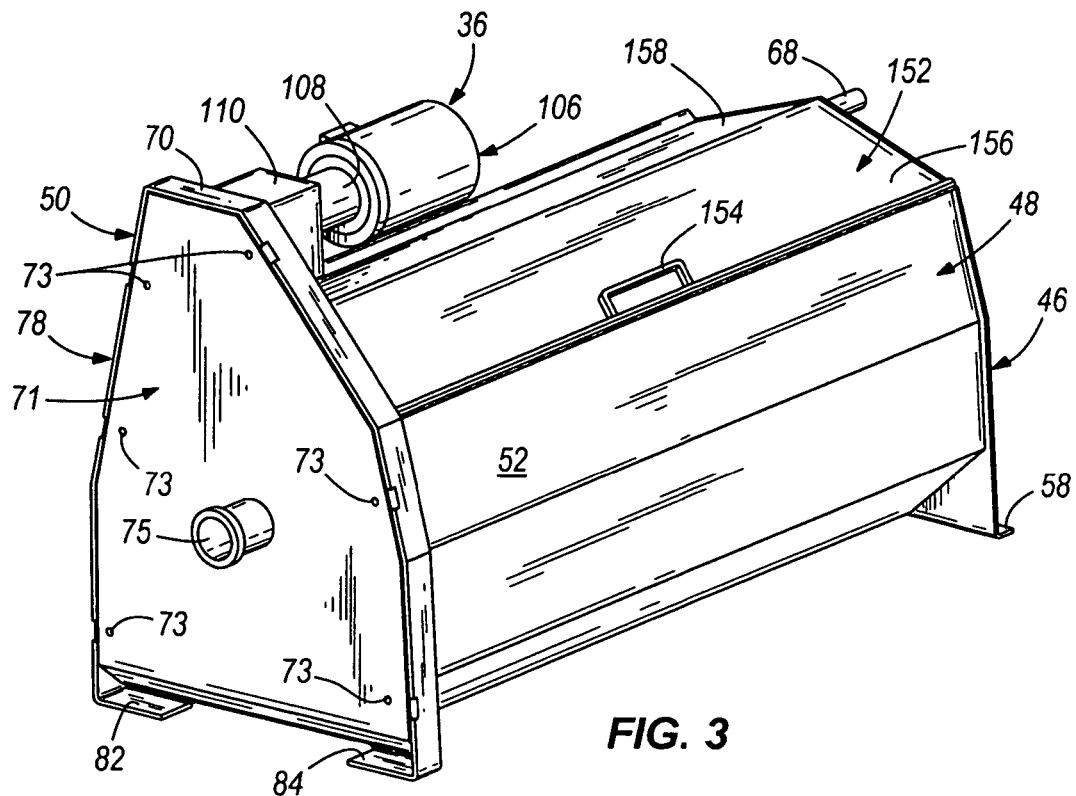
FIG. 3 is front perspective view of the rotary product processing device.

FIGS. 1–3 illustrate a rotary processing device 30 of the invention that includes a frame 32, a product conveying arrangement 34, and a drive assembly 36 coupled to the product conveying arrangement 34. Referring additionally to FIG. 2, the product conveying arrangement 34 is supported adjacent an inlet 38 by a bearing arrangement 40 and is supported adjacent an outlet 42 by another bearing arrangement 44. During operation, product to be processed enters the inlet 38, is processed while being moved along by the product conveying arrangement 34, and is expelled out the outlet 42.

The frame 32 includes an outlet end plate 46 to which at least one longitudinally extending sidewall arrangement 48 is anchored. The frame 32 also includes an inlet end plate 50 to which the at least one longitudinally extending sidewall arrangement 48 is also anchored. In the preferred embodiment shown in the drawing figures, the sidewall arrangement 48 is made up of a pair of sidewalls 52, 54 with each one of the sidewalls attached at its outlet end to the outlet end plate 46 and attached at its inlet end to the inlet end plate 50.

The outlet end plate 46 is of one-piece unitary and homogenous construction. In a preferred embodiment, the end plate 46 is cut from a sheet of stainless steel to a tolerance of about five thousandths of an inch using a cutting machine that preferably is a laser cutting machine. The outlet end plate 46 preferably rests directly upon the ground or upon a spacer or locator block (not shown) that is grounded. The end plate 46 has a generally planar section 56 and a pair of tabs 58, 60 that each serve as a foot for the rotary processing device. The pair of tabs 58, 60 is formed from the cut sheet such that they are integrally formed. As is shown in more detail in FIG. 2, the outlet end plate 46 has a relatively large circular bore 62 through which a journal 64 of the rotary product conveying arrangement 34 extends and a notch or bore 66 through which a conduit 68 is received.

Figure 4:
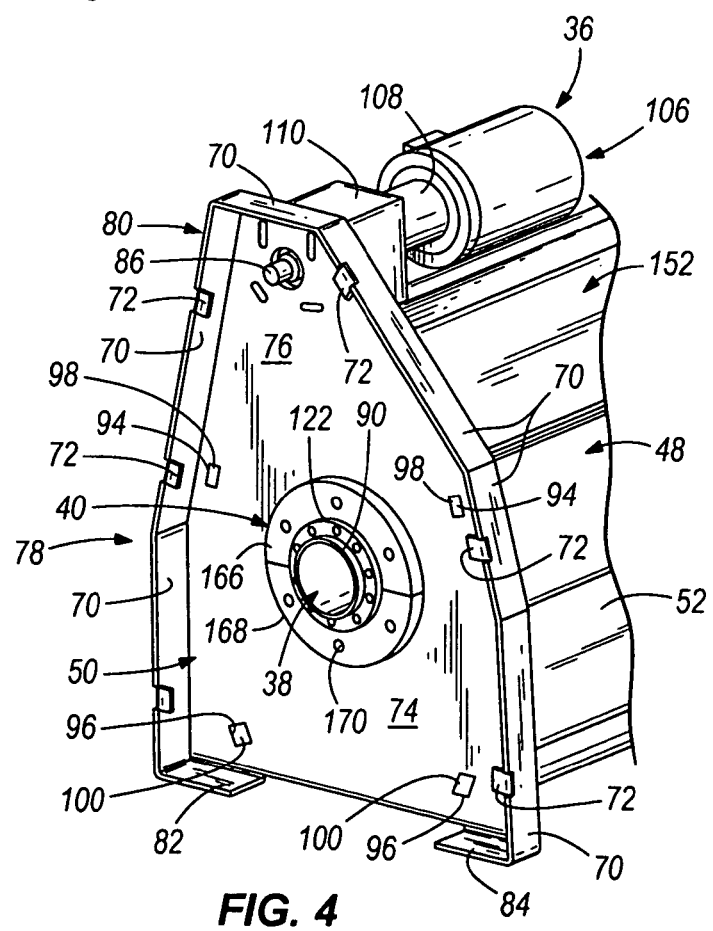
FIG. 4 is a fragmentary front perspective view of the rotary product processing device of the invention with a cover and parts of a drive assembly removed for clarity.

Referring additionally to FIG. 4, the inlet end plate 50 is also of one-piece unitary and homogenous construction. The end plate 50 preferably is cut from a sheet of stainless steel such that a plurality of pairs of sidewall forming flanges 70 are formed along with a plurality of pairs of mounting arms 72 that is each carried by a flange 70. The end plate 50 has a generally planar section 74 with a drive-carrying arm 76 that positions the drive assembly 36 such that it overlies a portion of a product conveying arrangement 34. Each bent flange 70 forms an outturned sidewall 80 about the periphery of the generally planar section 74 of the end plate 50, which increases end plate stiffness, structural rigidity and strength. Another pair of outturned integral flanges 82, 84 functions as a pair of feet for the rotary processing device 30.

When each sidewall forming flange 70 is desirably bent in the manner depicted, it forms part of the drive assembly enclosure 78 shown in FIGS. 3 and 4. As is shown in FIG. 3, an outer cover 71 mates with the inlet end plate 50 to complete the drive assembly enclosure 78. A plurality of fasteners 73 are used to attach the cover to the end plate 50. For example, each fastener 73 extends through a bore in the cover (not shown) and engages one of the mounting arms 72 to attach the cover 71 to the end plate 50. The cover 71 also includes an inlet conduit 75 that communicates matter to be processed to the inlet 38 of a product processing chamber 130.

Referring once again to FIG. 2, to accommodate a shaft 86 of the drive assembly 36, the drive-carrying arm 76 of the planar section 74 of the inlet end plate 50 has a bore 88 in it through which a portion of the shaft 86 extends. To accommodate a journal 90 of the inlet end of the rotary product conveying arrangement 34, the planar section 74 below the arm 76 has a second bore 92 through it.

The frame 32 is formed with a minimum of components thereby advantageously simplifying assembly, maintenance and expenses associated therewith. The frame 32 is formed by attaching the sidewall arrangement 48 to the end plates 46, 50 by bonding them together. One preferred bonding method is welding. When assembly is completed, the resultant frame 32 is strong, stiff, and structurally rigid enough to meet the continuous operational demands of rotary processing device operation.

To facilitate assembly, each end plate 46, 50 has a plurality of pairs of diagonally extending slots 94, 96 that each receive a corresponding lug 98, 100 that extends outwardly from a side edge 102, 104 of each sidewall panel 52, 54. For example, each side edge 102 and 104 of each sidewall panel 52, 54 has an upper lug 98 and a lower lug 100 that each extends outwardly from the side edge. During assembly, each end plate 46, 50 is vertically oriented and at least one of the sidewall panels 52, 54 is generally horizontally oriented with its upper lug 98 disposed adjacent an upper end plate slot 94 and its lower lug 100 disposed adjacent a lower end plate slot 96. The end plates 46, 50 are brought toward the sidewall panel such that each lug 98, 100 is received in its corresponding slot 94, 96. The same is done with the other sidewall panel.

The end result is a frame assembly 32 that is self-aligning, substantially self-supporting, and which helps form its own fixture. As a result, attachment of the frame components is simpler and easier because, once the lugs are seated in their respective slots, a fabricator only needs to make sure that each end plate 46, 50 is firmly abutted against the adjacent side edge of each sidewall panel 52, 54 before attaching the components together. For example, after assembly and making sure each end plate is firmly abutted against the adjacent side edge of each sidewall panel, each end plate is bonded, preferably by welding, to each adjacent sidewall panel, preferably along its side edge.

Figure 5:
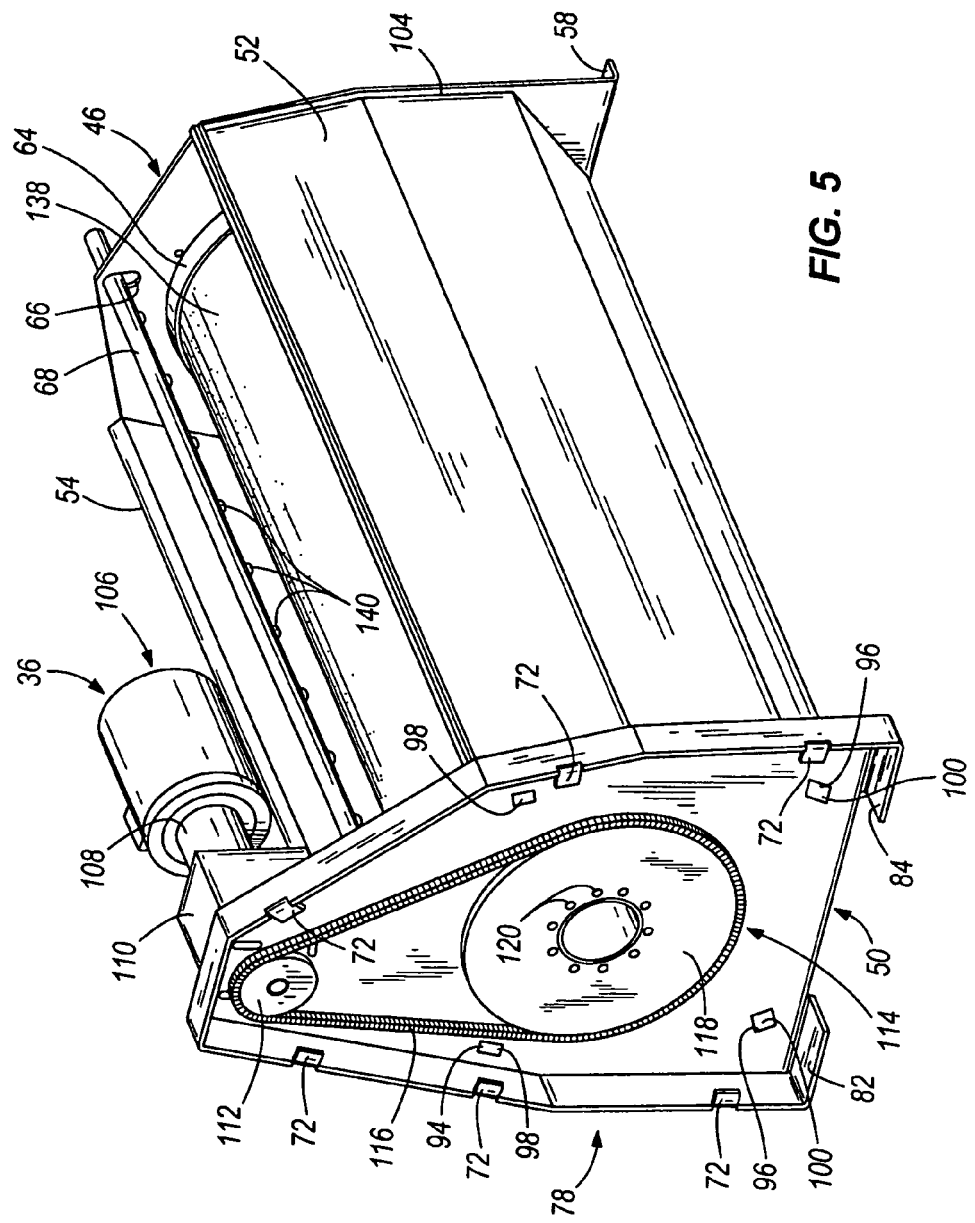
FIG. 5 is a fragmentary front perspective view of the rotary product processing device of the invention with a cover removed to show parts of a drive assembly and a hood removed to show a product processing chamber and conduit.

FIGS. 2–4 illustrate a drive assembly 36 of the invention in more detail. The drive assembly 36 includes a drive 106 that is mounted by a coupling arm 108 to a gearbox 110 that is fixed to the drive-carrying arm portion 76 of the inlet end plate 50. The gearbox shaft 86 extends through bore 88 (FIG. 2) in the end plate 50 where it receives a drive wheel 112 of a drive arrangement 114. An endless flexible member 116 connects the drive wheel 112 to a driven wheel 118 for rotation substantially in unison therewith. The driven wheel 118 is mounted by a plurality of fasteners 120 (FIG. 5) to a collar 122 (FIG. 4) of the inlet end journal 90.

In a preferred embodiment, the drive 106 is an electric motor that can be selectively controlled so as to vary its speed. The coupling arm 108 preferably is a tube that fixes the motor 106 to the gearbox 110 but which also couples the output shaft 124 of the motor 106 to an input (not shown) of the gearbox 110. The gearbox 110 preferably comprises a gear reducer or the like. The gearbox 110 is mounted by a bracket 126 that permits positioning adjustments to be made to the gearbox 110 and the like. The drive wheel 112 preferably is a sheave, a pulley, a sprocket, or the like and the endless flexible member 116 preferably is a belt, a cable, a chain or the like.

Figure 6:
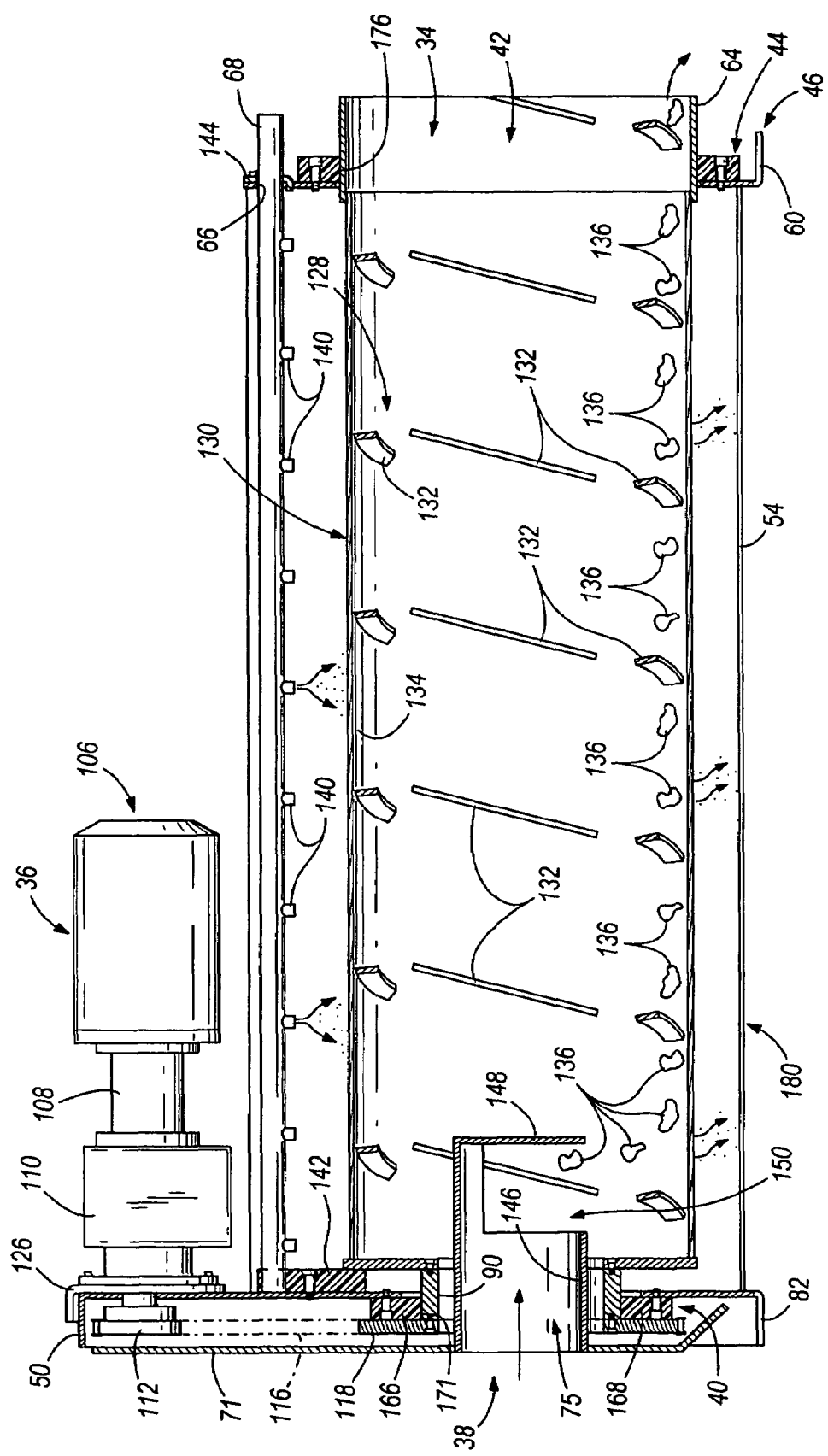
FIG. 6 is a cross-sectional view of the rotary product processing device.

Referring additionally to FIG. 6, the product conveying arrangement 34 rotates during operation. In the preferred embodiment shown in the drawing figures, the product conveying arrangement 34 includes an auger 128 disposed inside a product processing chamber 130. The product processing chamber 130 preferably also rotates during operation, preferably in unison with the auger 128. In the preferred embodiment shown in the drawing figures, the auger 128 consists of a plurality of pairs of axially, circumferentially and angularly spaced apart flights 132 that are each attached to an interior processing chamber surface 134. Each auger flight 132 preferably is attached to the interior processing chamber sidewall surface 134 using a plurality of fasteners (not shown) or the like that fix the flight 132 thereto. The auger flights 132 preferably are arranged in a generally helical pattern so as to forwardly urge product 136 in the processing chamber 130 through the chamber 130 during rotation.

The product processing chamber 130 has a body 138 that is of tubular construction with it being oriented such that its inlet end is located adjacent the inlet 38 of the rotary processing device 30 and its outlet end is located adjacent the outlet 42 of the device. Preferably, the product processing chamber body 138 is of generally cylindrical and perforate construction. In one preferred embodiment, the chamber body 138 is comprised of a screen that preferably is a wedgewire screen or the like.

The conduit 68 is disposed above the product processing chamber 130 and is equipped with a plurality of pairs of longitudinally spaced apart discharge orifices 140 that each preferably comprises a discharge nozzle. The spaced apart nozzles 140 preferably extend substantially the full length of the processing chamber 130 to enable coverage therealong. One end of the conduit 68 is cradled in a notch 66 (FIG. 2) in the outlet end plate 46 and the other end is received in a mounting block 142 that is attached to the inlet end plate 50. A mounting bracket 144 that is attached to the outlet end plate 46 helps keep the conduit 68 captive to the end plate 46.

FIG. 6 illustrates a cross sectional view of the inlet tube 75. The inlet tube 75 has a sidewall 146 of generally cylindrical construction and a downwardly extending discharge plate 148 that defines a generally downwardly opening discharge outlet 150. During operation, product and the like entering the inlet tube 75 can impinge against the discharge plate 148 before falling downwardly into the product processing chamber 130.

Referring once again to FIGS. 1 and 2, a hood 152 overlies the conduit 68, the auger 128, and the product processing chamber 130, and preferably abuts or adjoins both end plates 46 and 50. The hood 152 is of one-piece, unitary and homogenous construction and it includes a pair of spaced apart and integrally formed handles 154. The hood 152 has two halves 156, 158 with one hood half 156 being obtusely angled relative to the other hood half 158.

Figure 7:
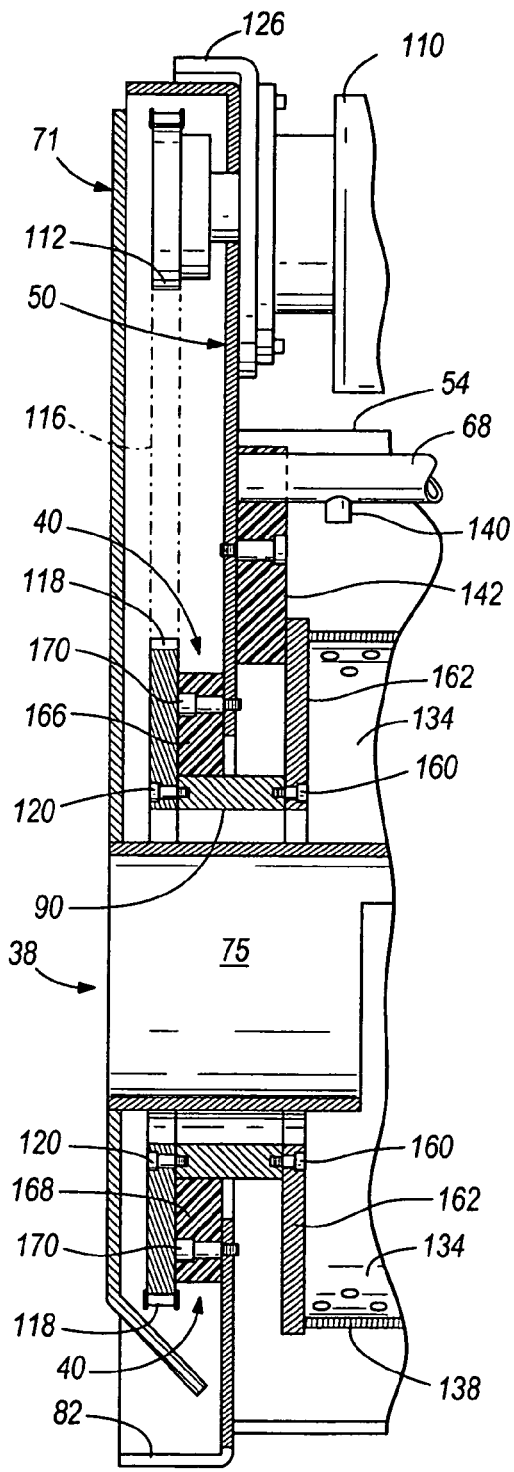
FIG. 7 is an enlarged cross sectional view of the inlet end of the rotary product processing device.

Referring to FIG. 7, the inlet tube 75 is generally coaxial with and received in the inlet end journal 90. As is shown in FIG. 7, the inlet tube 75 has a diameter that is less than the diameter of the inlet end journal 90 to permit the journal 90 to rotate relative to the tube 75.

The inlet end journal 90 preferably is generally cylindrical so as to facilitate rotation of the product processing chamber 130 to which it is coupled. In the preferred embodiment shown in FIG. 7, the journal 90 is attached at one axial end by fasteners 120 to driven wheel 118 and at its other axial end by fasteners 160 to an end cap 162 that is attached to an axial end of the body 138 of the product processing chamber 130. In one preferred embodiment, the end cap 162 is attached to an axial end of the body 138 of the product processing chamber 130 by a plurality of pairs of fasteners (not shown). In another preferred embodiment, the end cap 162 is attached by a weld (not shown) to the processing chamber body 138.

The inlet end bearing arrangement 40 is a bearing ring assembly 164 that encompasses the bore 92 in the inlet end plate 50 and that encircles the inlet end journal 90. Referring once again to FIG. 2, the annular bearing ring 164 is made up of an arcuately shaped upper bearing cradle 166 that overlies the journal 90 and an arcuately shaped lower bearing cradle 168 that underlies the journal 90. Each bearing cradle 166, 168 is attached to the inlet end plate 50 by a plurality of fasteners 170.

Figure 9:
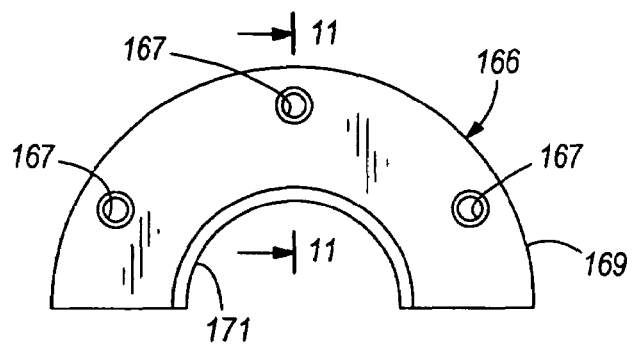
FIG. 9 is a front view of a preferred embodiment of an inlet end bearing cradle.
Figure 11:
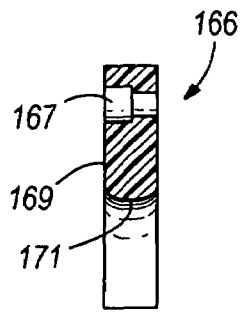
FIG. 11 is a cross section of the inlet end bearing cradle taken along line 11–11 of FIG. 9.
Figure 10:
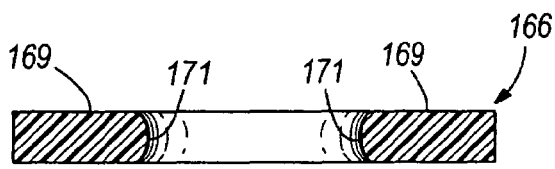
FIG. 10 is an end view of the inlet end bearing cradle.

Referring additionally to FIGS. 9–11, each bearing cradle 166 and 168 is of one-piece, unitary and homogeneous construction. Each bearing cradle 166, 168 preferably is of semicircular construction with integrally formed bolt hole pockets 167 equiangularly spaced about the cradle. Each bearing cradle 166 and 168 is made of a nonmetallic material. One preferred material is nylon. Another preferred material is ultra-high molecular weight polyethylene. Each bearing cradle preferably also is lubricant impregnated. Where the rotary processing device 30 is used for food processing applications, the lubricant preferably is a food grade lubricant that can be mineral oil based.

Each bearing cradle 166 and 168 has a pair of bearing surfaces 169 and 171 with one of the bearing surfaces 169 being a thrust bearing surface and the other one of the bearing surfaces 171 being a bearing surface that supports the inlet end journal 90. During operation, collar 122 and/or driven wheel 118 bear against the thrust bearing surface 169.

During operation, the inlet end journal 90 bears against the rotary bearing surface 171. As is shown more clearly in FIG. 11, the rotary bearing surface 171 has a curvilinear outer profile that preferably is spherical or elliptical. Such a curvilinear bearing surface advantageously wears uniformly and provides increased bearing surface area contact as wear occurs. This helps increase bearing life while also being capable of handling widely varying bearing loads.

When wear of the bottom portion of the bearing surface 171 of the lower bearing cradle 168 becomes too great, the bearing mounting arrangement permits the lower bearing cradle 168 to be switched with the upper bearing cradle 166 to provide a less worn bearing surface 171. As a result, bearing life is advantageously further improved.

Figure 8:
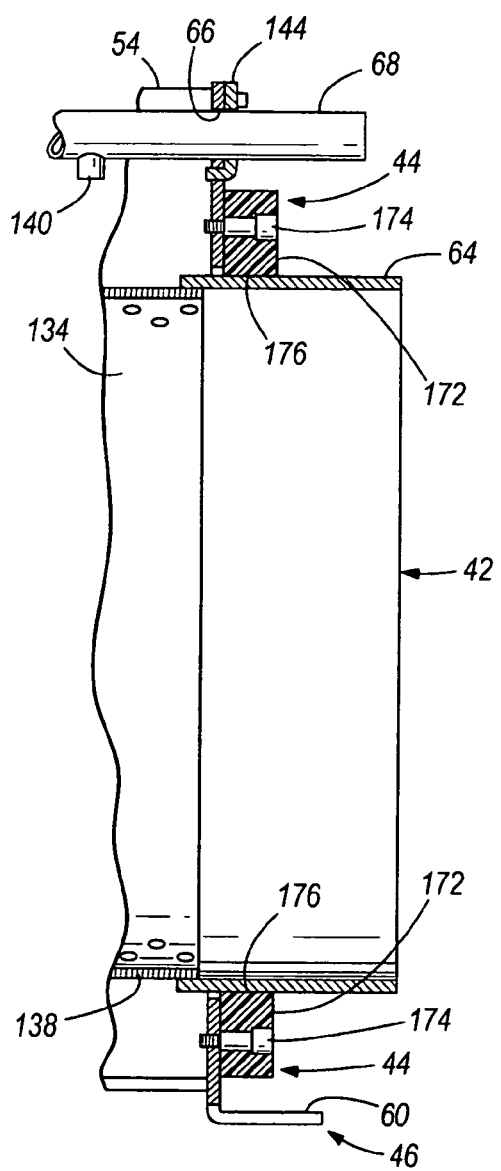
FIG. 8 is an enlarged cross sectional view of the outlet end of the rotary product processing device.

Referring to FIG. 8, the outlet end journal 64 is attached to the body 138 of the product processing chamber 130, preferably using fasteners, one or more welds, or the like. The outlet end journal 64 is ringed by an annular bearing arrangement 40 that preferably is a bearing ring 172 of one-piece, unitary and homogenous construction. The bearing ring 172 is attached to the outlet end plate 46 by a plurality of pairs of fasteners 174 that are circumferentially spaced about the ring 172.

Figure 14:
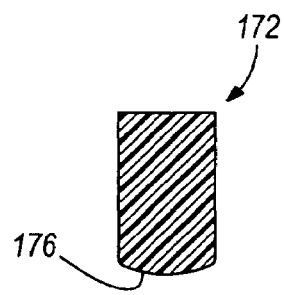
FIG. 14 is an enlarged cross sectional view of the outlet end bearing cradle taken along line 14–14 of FIG. 12.
Figure 13:
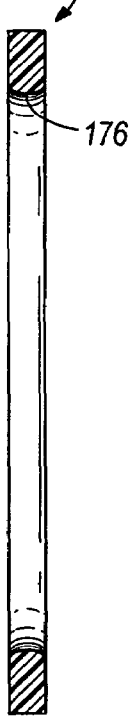
FIG. 13 is an cross sectional view of the outlet end bearing cradle taken along line 13–13 of FIG. 12.
Figure 12:
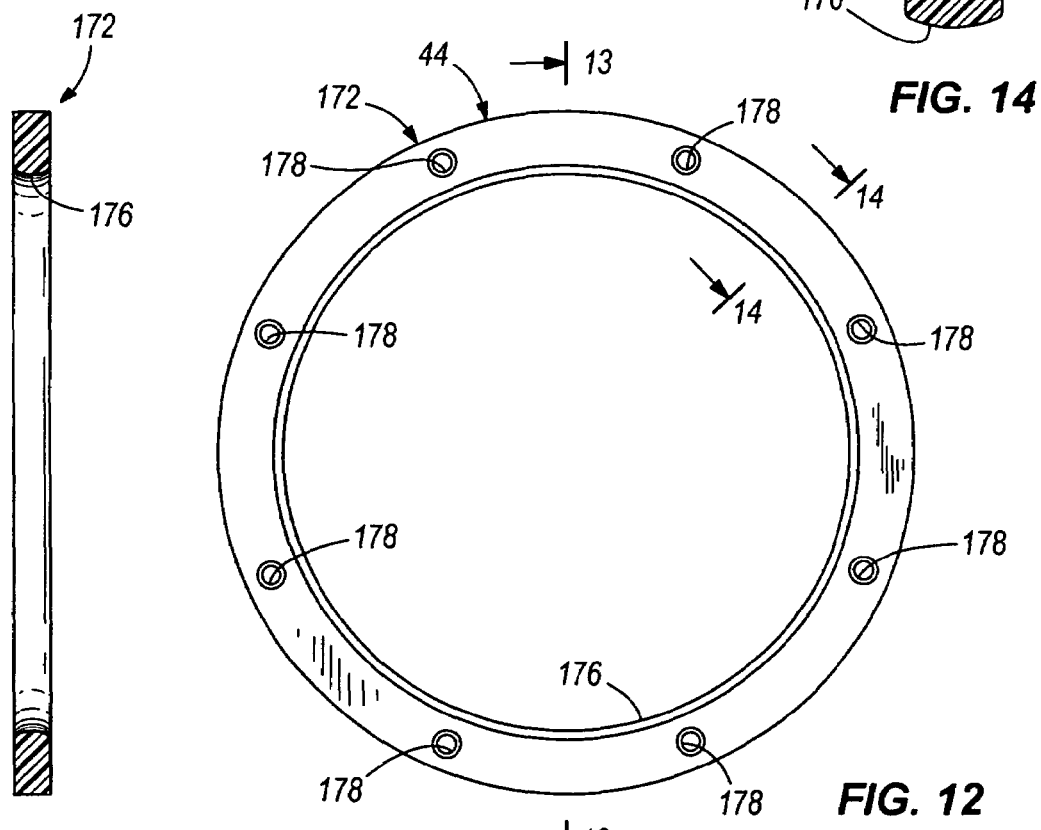
FIG. 12 is a front view of a preferred embodiment of an outlet end bearing cradle.

Referring additionally to FIGS. 12–14, the bearing ring 172 is made of a nonmetallic material. One preferred material is nylon. Another preferred material is ultra-high molecular weight polyethylene. The bearing ring preferably also is lubricant impregnated. Where the rotary processing device 30 is used for food processing applications, the lubricant preferably is a food grade lubricant that can be mineral oil based.

The bearing ring 172 preferably is circular in shape. The inner peripheral surface 176 of the bearing ring 172 is a bearing surface that rotatively supports the outlet end journal 64. The bearing ring 172 has a plurality of pairs of equiangularly spaced apart bolt hole pockets 178. When wear of the bottom of the bearing surface 176 becomes too great, this an arrangement permits the bearing ring 172 to be removed and rotated to move the worn portion of the bearing surface 176 away from the bottom, thereby moving a less worn portion of the bearing surface 176 to the bottommost position.

During operation, the outlet end journal 64 bears against the rotary bearing surface 176. As is shown more clearly in FIG. 14, the rotary bearing surface 176 has a curvilinear outer profile that preferably is spherical or elliptical. Such a curvilinear bearing surface advantageously wears uniformly and provides increased bearing surface area contact as wear occurs. This helps increase bearing life while also being capable of handling widely varying bearing loads.

In use, a rotary processing device 30 of the invention is well suited, for example, for processing food product, classifying applications, sieve and screen applications, and grading and sorting applications. In one preferred embodiment, a rotary processing device 30 fabricated in accordance with the invention is well suited for use as a reclaim screen. In another preferred embodiment, a rotary processing device 30 fabricated in accordance with the invention is well suited for use as a grader or classifier. In a still further preferred embodiment, a rotary processing device 30 fabricated in accordance with the invention is well suited for use as a blancher, cooker or cooler.

When configured as a reclaim screen, the rotary processing device 30 is configured as depicted in the drawing figures. During operation, waste product 136 to be processed passes through the inlet tube 75 where it enters the product processing chamber 130. Auger rotation urges the waste product 136 from adjacent the inlet end of the product processing chamber 130 toward the outlet end. As the waste product 136 travels along the chamber 130, matter, primarily water, falls through the perforations in the chamber body 138 into a collector (not shown) below a bottom opening 180 (FIG. 6) created between the frame sidewalls 52, 54. Waste product 136 exiting the outlet 42 is gathered in a separate collector (not shown) where it preferably awaits disposal. During operation, liquid preferably is expelled from the discharge nozzles 140 of the conduit 68 to keep waste product 136 from plugging perforations in the chamber body 138 and to dislodge waste product 136 that is plugging such perforations.

When configured as a grader or classifier, product 136 entering the processing chamber 130 is graded or classified according to the size of the perforations in the chamber body 138. Product 136 sized about the same or smaller than perforations in the chamber body 138 falls through the perforations into a collector (not shown) below the body 138. Larger product 136 travels along the length of the chamber 130 where it is expelled out the outlet.

When configured as a blancher, cooker or cooler, the sidewalls 52, 54 are joined or configured to form a sidewall of one-piece and unitary construction that forms a fluid-holding tank that underlies and encompasses at least part of the product processing chamber 130. The fluid-holding tank preferably holds a liquid, preferably water, which is used in the processing of product 136 as it travels along the product processing chamber 130. The product 136 preferably is a food product, such as pasta, beans, peas, corn, syrup, sauce, or the like. If desired, the product 136 being processed can be pouched food product.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A rotary product processing device comprising:
   (a) a frame comprised of a pair of generally upright end plates in engagement with at least one generally horizontally extending sidewall spacing the end plates apart with one of the end plates disposed adjacent an infeed end and the other one of the end plates disposed adjacent a discharge end;
   (b) an elongate and generally horizontal perforate product processing chamber carried by the frame with the perforate product processing chamber having an infeed disposed adjacent one of the end plates and an outlet disposed adjacent the other one of the end plates;
   (c) an auger disposed in the product processing chamber between the pair of end plates and capable of urging by rotation a plurality of products received in the product processing chamber from an entry location at or adjacent the infeed toward and out the discharge;
   (d) a drive operatively coupled to the auger and carried by one of the end plates the drive disposing the drive inboard and between the pair of end plates with the drive in overlapping relationship with part of the product processing chamber.

2. The rotary product processing device of claim 1, further comprising a drive arrangement disposed at an angle relative to the drive with the drive arrangement operatively coupling the drive to the auger and the drive arrangement disposed adjacent and along one side of the same one of the end plates that carries the drive.

3. The rotary product processing device of claim 2, wherein the drive is mounted drive arrangement comprises a drive wheel mounted to an output shaft of the drive and coupled by an endless flexible member to a driven wheel in operable communication with the auger.

4. The rotary product processing device of claim 3, wherein the driven wheel further includes a bore formed therein that also comprises one of the infeed and discharge with the driven wheel encircling the one of the infeed and discharge.

5. The rotary product processing device of claim 2, wherein the end plates and the at least one sidewall comprise a housing that encloses the product processing chamber and the auger, and further comprising a cover overlying the drive arrangement and the one of the end plates that carries the drive and drive arrangement defining a drive arrangement housing that substantially encloses the drive arrangement.

6. The rotary product processing device of claim 1, wherein at least one of the pair of end plates has a product passageway adjacent one of the infeed and discharge and further comprising:
   (1) a journal in operable cooperation with the auger adjacent one of the infeed end and discharge end; and
   (2) a bearing arrangement comprising a generally U-shaped bearing cradle of one-piece and unitary construction that (i) is carried by the at least one of the pair of end plates, (ii) extends about at least part of the periphery of the product passageway formed in the at least one of the pair of end plates, and (iii) presents a generally U-shaped bearing surface towards the journal so rotatively supports the journal during journal rotation.

7. The rotary product processing device of claim 6, wherein the auger comprises a plurality of generally helically extending auger flights, each of which is engaged with the product processing chamber such that both rotate in unison.

8. The rotary product processing device of claim 1, further comprising a bearing of one-piece, unitary, non-metallic, and substantially homogenous construction carried by each one of the pair of end plates with each bearing having a rotary bearing surface that is curvilinearly contoured along an axial direction generally parallel to an axis of rotation of the product processing chamber providing rotary bearing support for journal connected to the auger.

9. The rotary product processing device of claim 1, further comprising an arcuate bearing of one-piece, unitary, non-metallic, and substantially homogenous construction immovably mounted via a plurality of fasteners to each one of the end plates with each bearing having a journal-contacting rotary bearing surface formed by an inner radial surface of the bearing and each bearing having three angularly spaced apart mounting apertures radially of the rotary bearing surface each of which receives one of the plurality of fasteners enabling angularly indexing of the bearing changing the angular location of which part of the rotary bearing surface is subject to wear by changing where rotary bearing contact is made with the journal.

10. The rotary product processing device of claim 1, further comprising an infeed end annular bearing arrangement disposed at one end of the product processing chamber that is immovably fixed to and abutting against one of the end plates and bounding the periphery of an infeed passage formed in the one of the end plates with the inner radial surface of the infeed end bearing arrangement comprising a rotary bearing surface rotatively supporting at least one of the rotary product processing chamber and the auger adjacent the infeed end, and a discharge end annular bearing arrangement disposed at the other end of the product processing chamber that is immovably fixed to and abutting against the other one of the end plates and bounding the periphery of a discharge passage formed in the other one of the end plates with the inner radial surface of the discharge end bearing arrangement comprising a rotary bearing surface rotatively supporting the at least one of the rotary product processing chamber and the auger adjacent the discharge end.

11. The rotary product processing device of claim 1, wherein the product processing chamber has a journal at each end that is rotatively supported by a non-moving arcuate bearing fixed to each end plate having an elongate arcuately extending bearing surface that rotatively supports one of journals along a complementarily contoured arcuate portion of its circular outer surface.

12. The rotary product processing device of claim 1, wherein the product processing chamber has an outwardly projecting axially extending circular journal at each end that is cradled by a non-moving arcuate bearing that is of one-piece, unitary, homogenous and non-metallic construction fixed to the frame with one bearing having an arcuate elongate and non-rotatable radially inner bearing surface cradling and in bearing surface contact with at least a portion of the outer circumference of the journal disposed at or adjacent the infeed end and the other bearing having an arcuate elongate and non-rotatable radially inner bearing surface cradling and in bearing surface contact with at least a portion of the outer circumference of the journal disposed at or adjacent the discharge end and wherein the bearing surface of each bearing has an elliptical or spherical transversely extending outer bearing surface contour.

13. The rotary product processing device of claim 1, wherein the frame comprises an end plate of one piece and unitary construction that carries the drive such that the drive is disposed above the rotary processing chamber such that it overlies part of the rotary processing chamber.

14. The rotary product processing device of claim 1, wherein each one of the end plates is of one piece and unitary construction and the at least one sidewall comprises an elongate sidewall panel of one piece and unitary construction that has a pair of side edges, with one of the side edges abutting one of the end plates and the other one of the side edges abutting the other one of the end plates, wherein each side edge has a plurality of locator tabs extending outwardly therefrom that are each received in a locator slot disposed in a corresponding one of the end plates.

15. The rotary product processing device of claim 14, wherein each locator tab and each locator slot extend diagonally and when mated such that each locator tab is received in its corresponding locator slot self fixturing the frame for fabrication.

16. The rotary product processing device of claim 1, wherein the frame comprises a vertically extending end plate of one piece and unitary construction that carries the drive and the frame comprises a vertically extending cover that overlies the end plate forming a drive assembly housing therebetween and wherein the drive further comprises a drive assembly disposed in the drive assembly housing.

17. The rotary product processing device of claim 1, wherein the product processing chamber comprises a perforate drum, and further comprising a pair of non-metallic bearing cradles immovably attached to the frame with one of the non-metallic bearing cradles rotatively supporting one end of the perforate drum via an arcuate friction-bearing rotary bearing surface that is fixed relative to the frame and the other end of the non-metallic bearing cradles rotatively supporting the other end of the perforate drum via an arcuate friction-bearing rotary bearing surface that is fixed relative to the frame.

18. The rotary product processing device of claim 1, wherein the end plates are each of one piece and unitary construction and have a bore formed there-through above the product processing chamber and further comprising a conduit overlying the product processing chamber and having one end received in the through bore in one of the end plates, its other end received in the through bore in the other one of the end plates, and comprising a plurality orifices spaced apart along the conduit from which fluid is dischargeable.

19. The rotary product processing device of claim 1, wherein the end plate that carries the drive is formed of a sheet of one-piece and unitary construction, wherein the drive is carried by the end plate and oriented so it overlies at least part of the product processing chamber, and further comprising a driveline coupling the drive to the auger with the driveline also carried by the same end plate that carries the drive.

20. A rotary product processing device comprising:
 (a) a frame comprised of a plurality of end plates that are each of one piece and unitary construction and a sidewall of one piece and unitary construction that is joined along one side edge to one of the end plates and is joined along its other side edge to the other one of the end plates;

(b) a bearing cradle fixed to each end plate of one-piece, unitary and homogenous polymeric construction having a radially inwardly facing arcuate fixed bearing surface;

(c) a tubular and perforate product processing chamber rotatively supported at or adjacent each end by one of the bearing cradles having a radially outwardly facing outer end surface that is rotatively supported on the radially inwardly facing arcuate fixed bearing surface; and (d) a drive mounted to one of the end plates that is coupled by a drive arrangement carried by the one of the end plates to the product processing chamber.

21. The rotary product processing device of claim 20, wherein each bearing cradle comprises a bearing ring that encircles the outside of a corresponding outwardly facing outer product processing chamber end surface with its radially inwardly facing arcuate bearing surface comprising an outer bearing surface that contacts the outwardly facing outer product processing chamber end surface that is curved along an axial direction that is generally parallel to an axis of rotation of the product processing chamber.

22. The rotary product processing device of claim 21, wherein the curved outer bearing contact surface comprises a spherical or elliptical outer bearing contour.

23. The rotary product processing device of claim 20, wherein the sidewall is constructed and arranged to underlie the processing chamber and form a fluid-holding tank.

24. The rotary product processing device of claim 20, further comprising a generally helical auger disposed in the product processing chamber.

25. The rotary product processing device of claim 24, wherein the auger is carried by the product processing chamber for rotation substantially in unison therewith and wherein each radially outwardly facing outer end surface of the product processing chamber comprises a generally cylindrical journal that defines one of a product processing chamber inlet and product processing chamber outlet that projects outwardly in an axial direction from the product processing chamber.

26. A rotary product processing device comprising:

(a) a frame comprised of a plurality of end plates that are each of one piece and unitary construction and a sidewall of one piece and unitary construction that is engaged along one side edge to one of the end plates and is engaged along its other side edge to the other one of the end plates, wherein one of the end plates has an inlet bore and the other one of the end plates has an outlet bore;

(b) a first arcuate bearing cradle of one-piece, unitary, non-metallic and homogenous construction that is immovably fixed to one of the end plates and that comprises an arcuate radial bearing contact surface encircling at least a portion of the inlet bore;

(c) a second arcuate bearing cradle of one-piece, unitary, non-metallic and homogenous construction that is immovably fixed to the other one of the end plates and that comprises an arcuate radial bearing contact surface encircling at least a portion of the outlet bore;

(d) a tubular product processing chamber having a perforate body with a journal at each end with one journal rotatively supported by the arcuate radial outer bearing contact surface of one of the bearing cradles and the other journal rotatively supported by the arcuate radial outer bearing contact surface of the other one of the bearing cradles;

(e) a drive carried by the frame that is coupled to the product processing chamber; and (f) wherein the bearing contact surface of at least one of the bearing cradles comprises an elliptical or spherical contoured contact surface portion.

27. The rotary product processing device of claim 26, wherein one of the first and second bearing cradles comprises both a rotary bearing and a thrust bearing.

28. A rotary product processing device comprising:

(a) a plurality of end plates and a sidewall extending therebetween, wherein one of the end plates has an inlet bore and the other one of the end plates has an outlet bore;

(b) a first annular bearing of non-metallic construction that is immovably fixed to one of the end plates and encompassing the inlet bore;

(c) a second annular bearing of non-metallic construction that is immovably fixed to the other one of the end plates and encompassing the outlet bore;

(d) a tubular product processing chamber having a perforate body with a journal at each end with one journal rotatively supported by the first annular bearing and the other journal rotatively supported by the second annular bearing; and (e) a drive that is coupled to the product processing chamber for rotating the product processing chamber relative to the first and second annular bearings.

29. The rotary product processing device of claim 28, wherein one of the first and second annular bearings comprises both a rotary bearing and a thrust bearing at least one of the first and second annular bearings is immovably fixable using a plurality of pairs of fasteners to one of a plurality of mounting positions enabling the one of the first and second annular bearings to be rotated and re-mounted to change the position of wear of the rotary bearing one of the first and second annular bearings, wherein the rotary bearing has a curved rotary bearing surface contour that contacts a radial surface of a corresponding one of the journals to rotatively support the journal during rotation of the product processing chamber.

30. A rotary product processing device comprising:

(a) a frame comprised of a plurality of end plates that are each of one piece and unitary construction and a sidewall of one piece and unitary construction that is engaged along one side edge to one of the end plates and is engaged along its other side edge to the other one of the end plates, wherein one of the end plates has an inlet bore and the other one of the end plates has an outlet bore;

(b) a first bearing disposed adjacent the inlet bore;

(c) a second bearing disposed adjacent the outlet bore;

(d) a tubular product processing chamber having a perforate body with a journal at each end with one journal rotatively supported by one of the bearings and the other journal rotatively supported by the other one of the bearings;

(e) a drive mounted to one of the end plates and disposed so it is above and overlies part of the product processing chamber; and (f) a drive arrangement that is carried by the one of the end plates that couples the drive to the product processing chamber enabling the drive to rotate the product processing chamber, wherein the drive arrangement comprises (i) a drive wheel driven by the drive, (ii) a driven wheel that rotates the product processing chamber when the driven wheel is rotated and (iii) an endless flexible member that is oriented generally perpendicularly to the drive and generally parallel to a lengthwise direction of the one of the end plates that couples the drive wheel to the driven wheel transmitting rotary motion of the drive wheel when rotated by the drive to the driven wheel rotating the product processing chamber.

31. The rotary product processing device of claim 30, wherein the driven wheel further includes a bore formed therein that also comprises one of the infeed and discharge with the driven wheel encircling the one of the infeed and discharge.

32. A rotary product processing device comprising:
(a) a plurality of vertically extending end plates that are each of one piece and unitary construction and a sidewall of one piece and unitary construction disposed between the end plates, wherein one of the end plates has an inlet bore and the other one of the end plates has an outlet bore;
(b) a first bearing arrangement of non-metallic and homogenous construction that is carried by one of the end plates adjacent the inlet bore;
(c) a second bearing arrangement of non-metallic and homogenous construction that is carried by the other one of the end plates adjacent the outlet bore;
(d) a tubular product processing chamber having a perforate body with a journal at each end with one journal rotatively supported by one of the bearing arrangements and the other journal rotatively supported by the other one of the bearing arrangements;
(e) a drive carried by one of the end plates and overlying the product processing chamber;
(f) a drive arrangement that is carried by the one of the end plates that couples the drive to the product processing chamber with the drive arrangement extending in generally lengthwise direction relative to the one of the end plates along a vertically extending portion of the one of the end plates; and
(g) a vertically extending cover removably mounted to the one of the end plates that overlies at least a portion of the drive arrangement and the one of the end plates such that the drive arrangement is disposed between the vertically extending cover and the one of the end plates.

33. A rotary product processing device comprising:
(a) a plurality of generally vertically extending end plates spaced apart by a sidewall with one of the end plates including a through-bore formed in it comprising a inlet and the other one of the end plates including a through-bore formed in it comprising a discharge;
(b) a first annular bearing disposed adjacent one of end plates and encircling one of the inlet and discharge;
(c) a second annular bearing disposed adjacent the other one of end plates and encircling the other one of the inlet and discharge;
(d) an elongate, tubular and perforate rotary product processing chamber rotatively supported at one end by the first annular bearing and rotatively supported at the other end by the second annular bearing;
(e) a rotary drive mounted to one of the end plates overlying the product processing chamber;
(f) a generally vertically extending drive arrangement coupling the rotary drive to the product processing chamber that is disposed along a generally vertically extending surface of the one of the end plates to which the rotary drive is mounted; and
(g) a cover mounted to the one of the end plates to which the rotary drive is mounted forming a housing with the one of the end plates that substantially encloses the drive arrangement between the cover and the one of the end plates.

34. A rotary product processing device comprising:
(a) a plurality of generally vertically extending end plates spaced apart by a sidewall with one of the end plates including a through-bore formed in it comprising a inlet and the other one of the end plates including a through-bore formed in it comprising a discharge;
(b) a first annular bearing disposed adjacent one of end plates and encircling one of the inlet and discharge, the first annular bearing being of one-piece, unitary, non-metallic and substantially homogenous construction and having a radial bearing contact surface that is one of spherical and elliptical along an axial direction that is generally parallel to an axis of rotation of the rotary product processing device;
(c) a second annular bearing disposed adjacent the other one of end plates and encircling the other one of the inlet and discharge, the second annular bearing being of one-piece, unitary, non-metallic and substantially homogenous construction and having a radial bearing contact surface that is one of spherical and elliptical along an axial direction that is generally parallel to an axis of rotation of the rotary product processing device;
(d) an elongate, tubular and perforate rotary product processing chamber rotatively supported at one end on the radial bearing contact surface of the first annular bearing and rotatively supported at the other end on the radial bearing contact surface of the second annular bearing;
(e) a rotary drive that is operatively coupled to the product processing chamber by a driven wheel having a through-bore the comprises part of one of the inlet and discharge enabling rotation of the product processing chamber during operation.

35. A rotary product processing device comprising:
(a) a plurality of generally vertically extending end plates spaced apart by a sidewall with one of the end plates including a through-bore formed in it comprising a inlet and the other one of the end plates including a through-bore formed in it comprising a discharge;
(b) a first annular bearing disposed adjacent one of end plates and encircling one of the inlet and discharge, the first annular bearing being of one-piece, unitary, non-metallic and substantially homogenous construction and having a radial bearing contact surface that is one of spherical and elliptical along an axial direction that is generally parallel to an axis of rotation of the rotary product processing device;
(c) a second annular bearing disposed adjacent the other one of end plates and encircling the other one of the inlet and discharge, the second annular bearing being of one-piece, unitary, non-metallic and substantially homogenous construction and having a radial bearing contact surface that is one of spherical and elliptical along an axial direction that is generally parallel to an axis of rotation of the rotary product processing device;
(d) an elongate, tubular and perforate rotary product processing chamber rotatively supported at one end on the radial bearing contact surface of the first annular bearing and rotatively supported at the other end on the radial bearing contact surface of the second annular bearing;

(e) a rotary drive mounted to one of the end plates overlying the product processing chamber, the rotary drive comprising an electric motor having an output shaft;

(f) a drive arrangement coupling the rotary drive to the product processing chamber that is disposed along a generally vertically extending surface of the one of the end plates to which the rotary drive is mounted, the drive arrangement comprising a driven wheel having a through-bore that encircles one of the inlet and discharge that is operatively coupled to the electric motor output shaft by an endless flexible member disposed at an angle relative to the electric motor output shaft; and (g) a cover mounted to the one of the end plates to which the rotary drive is mounted forming a housing with the one of the end plates that substantially encloses the drive arrangement between the cover and the one of the end plates.

* * * * *

UNITED STATES PATENT AND TRADEMARK OFFICE
CERTIFICATE OF CORRECTION

PATENT NO. : 7,168,846 B1
APPLICATION NO. : 10/760442
DATED : January 30, 2007
INVENTOR(S) : Daniel D. Maupin It is certified that error appears in the above-identified patent and that said Letters Patent is hereby corrected as shown below:

Claim 3, column 8, line 40  Delete "drive is mounted"

Claim 12, column 9, line 61  Replace "arcuate"
                                  With --arcuate,--

Claim 12, column 9, line 66  Replace "arcuate"
                                  With --arcuate,--

Claim 29, column 12, line 30  Replace "bearing at least"
                                      With --bearing, at least--

Signed and Sealed this

Thirty-first Day of July, 2007

JON W. DUDAS
*Director of the United States Patent and Trademark Office*